May 8, 1962 M. BOYER 3,032,957
AUTOMATIC ROTARY LAWN MOWER
Filed Dec. 30, 1959 2 Sheets-Sheet 1

Martin Boyer
INVENTOR.

May 8, 1962
M. BOYER
3,032,957
AUTOMATIC ROTARY LAWN MOWER
Filed Dec. 30, 1959
2 Sheets-Sheet 2
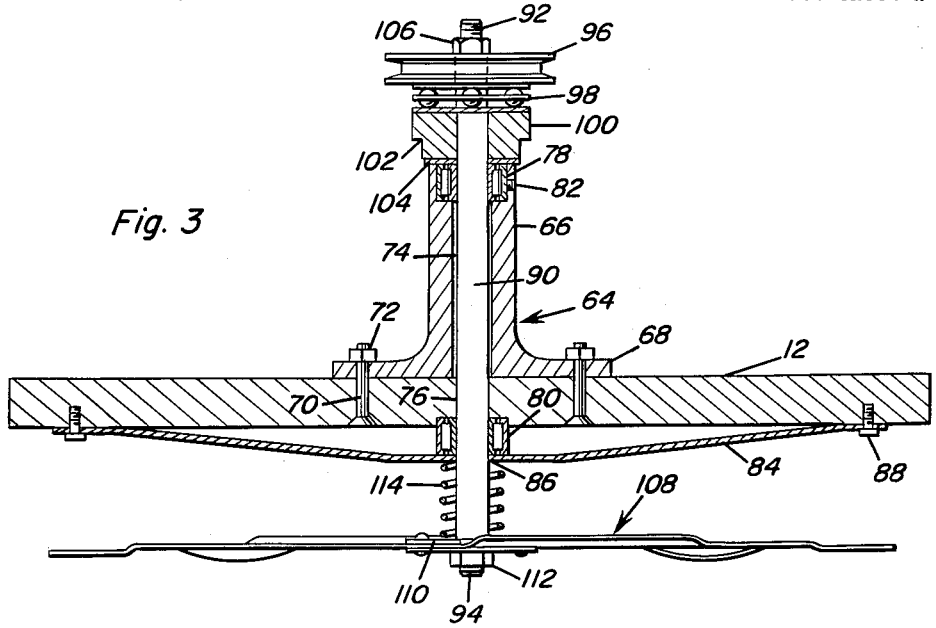
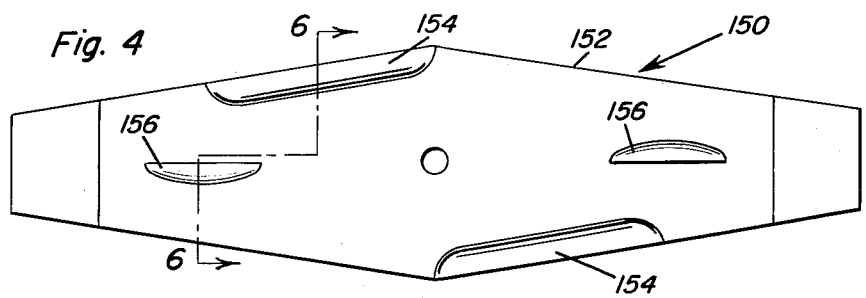
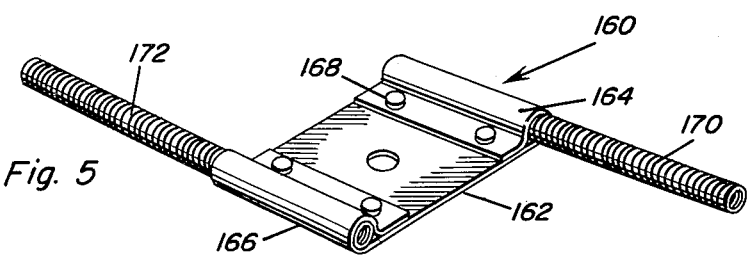
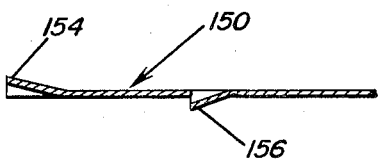
Martin Boyer
INVENTOR.
BY Clarence A. O'Brien
and Harvey B. Jacobson
Attorneys United States Patent Office 3,032,957
Patented May 8, 1962

3,032,957
AUTOMATIC ROTARY LAWN MOWER
Martin Boyer, Box 24, Lowry, Minn.
Filed Dec. 30, 1959, Ser. No. 863,015
6 Claims. (Cl. 56—25.4)

This invention relates generally to lawn mower equipment and more particularly to an automatic rotary lawn mower which utilizes an implement drive shaft which extends vertically through the lawn mower base and which may slide relative thereto depending upon the terrain so as to maintain the implement it carries at a constant spacing above the ground surface.

Most power lawn mowers utilize rotatable implements which are fixed vertically and accordingly will cut grass to different heights as the lawn mower wheels move over the undulated terrain. Some power lawn mowers are provided with spring mountings for the ground wheels so as to limit the effects of the terrain undulations. Neither of these types of lawn mowers provide perfect results and often the lawn is not mowed consistently throughout but instead is scalped in spots and relatively uncut in others. In view of this, it is the principal object of this invention to provide a novel lawn mower construction which is provided with positive guide means for continually engaging the ground surface for the purpose of slidably vertically moving the implement drive shaft so as to maintain the implement at the desired spacing above the ground surface.

It is a further object of this invention to provide a novel rotary lawn mower construction which may employ any of several implements for treating the lawn; that is, it is contemplated that a flexible cutting knife or blade having scalp prevention means thereon be utilized or in lieu thereof a novelly designed mulching implement.

It is a still further object of this invention to provide a novel rotary lawn mower construction which includes a base having a power source mounted thereon. It is within the contemplation of this invention to employ either an internal combustion gasoline engine or an electric motor for driving the mower drive shaft. Also, it should be appreciated that direct drive means or indirect drive means including a pair of pulleys with a belt or chain drive may be utilized.

It is a still further object of this invention to provide a novel and vastly improved rotary lawn mower which may be manufactured relatively inexpensively and which due to its substantial simplicity of construction is for the most part trouble free having accordingly low maintenance costs.

It is a still further object of this invention to provide a novel rotary lawn mower including a base having guard elements hinged thereto so as to be pivotable between a depending position extending toward the ground surface and a position extending remote from the ground surface. Also, it is to be appreciated that although the preferred embodiment of the invention is illustrated as including only three ground wheels, it should be understood that four ground wheels may be utilized with equal success.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged vertical sectional view through the base illustrating in detail the mower drive shaft slidably and rotatably mounted relative to the base;

FIGURE 4 is a top plan view of the flexible cutting knife or blade;

FIGURE 5 is a perspective view of a mulcher implement which may be utilized with the mower drive shaft in lieu of the cutting knife of FIGURE 4; and FIGURE 6 is a sectional view taken substantially along the plane 6—6 of FIGURE 4 illustrating particularly the cutting knife construction and showing the grass deflector and scalp prevention means.

Figure 1:
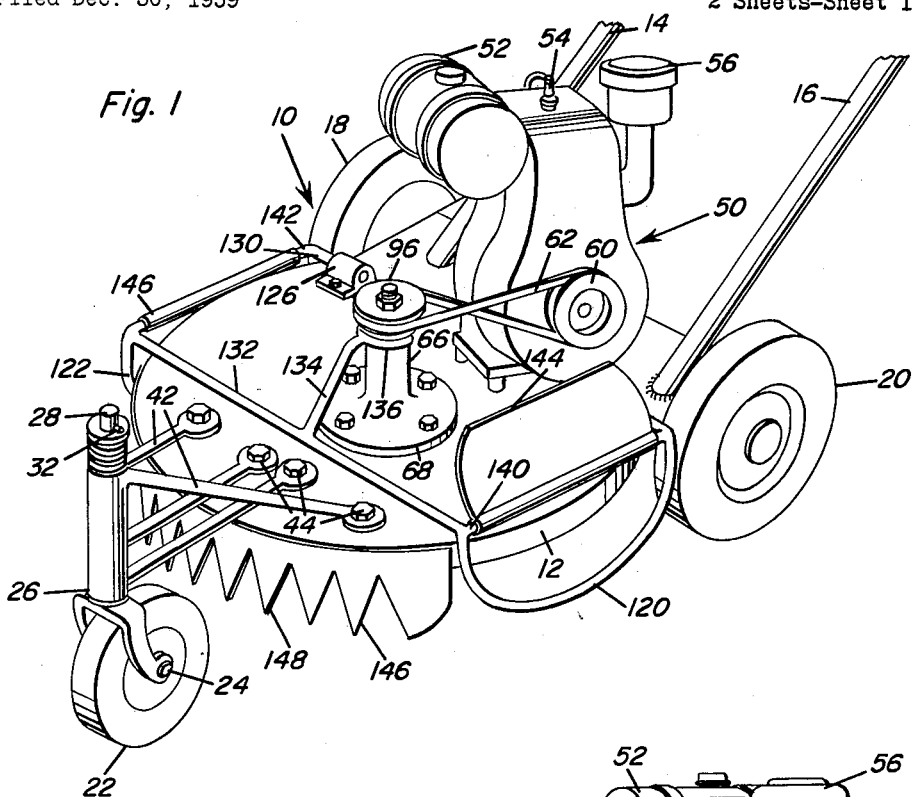
FIGURE 1 is a perspective view of the lawn mower construction illustrating one side guard in a hinged position remote from the ground surface and the second side guard in a hinged position extending toward the ground surface.

With continuing reference to the drawings, numeral 10 generally represents the invention comprising the lawn mower construction including a rigid base 12 having handles 14 and 16 rigidly secured thereto and extending therefrom. A pair of rear ground wheels 18 and 20, each including preferably rubber tires are rotatably supported relative to the base 12. A third wheel 22 including a rubber tire is rotatably carried on a spindle 24 supported between the bifurcations of a forked member 26. A rod 28 is secured to the bight portion of the forked member and extends upwardly through a sleeve 30 and is slidably movable relative thereto. A pin 32 is passed through an aperture in the rod 28 and a washer 34 and spring 36 are received on the rod 28 between the pin 32 and sleeve 30. The rod 28 is rotatable in the sleeve 30 so that the wheel 22 may pivot its direction of movement as well as rotate along the ground surface 40. Braces 42 are welded to the sleeve 30 and, in turn, bolted to the base 12 by bolts 44.

Supported by the base 12 at the rear thereof is a power source generally designated by the numeral 50 and illustrated in the drawings as an internal combustion gasoline engine including a fuel tank 52, spark plug 54, and breather 56. It is to be appreciated that the power source 50 may equally as well be an electric motor. In any event, an output shaft 58 is provided having a pulley 60 thereon which drives belt 62.

Attention is now particularly drawn to FIGURE 3. A boss 64 has an upstanding neck 66 and a circular transverse flange 68. Bolts 70 pass through the base 12 and the flange 68 and receive nuts 72 thereon for securing the boss 64 to the base 12. The boss is apertured at 74 and aligned with an opening 76 formed in the base 12. Roller bearings 78 and 80 are positioned concentric with the aperture 74 and opening 76 and secured respectively to the boss 64 as by a set screw 82 and to the base 12. A dish-shaped member 84 is also provided with a central aperture 86 in alignment with the aperture 74 and opening 76. The dish-shaped member is secured to the underside of the base by screws 88. A drive shaft 90 is provided being threaded on each end thereof as at 92 and 94. The drive shaft 90 receives thereon a pulley 96 secured thereto and adapted to ride on top of a ball bearing assembly 98. A collar 100 defining a shoulder 102 is also received on the drive shaft 90, resting on a leather washer 104 which, in turn, rests on the boss 64. A nut 106 is received on the threaded end 92 for preventing the pulley 96 from leaving the drive shaft 90. It will be appreciated that the drive shaft 90 and pulley 96 are rotatable with respect to the collar 100 due to ball bearing assembly 98. An implement 108 is bolted to a plate 110 drivingly connected to the drive shaft 90. It is contemplated that the drive shaft 90 be provided with a square portion received in a square hole in the plate 110 so as to drive the plate 110 and attached implement 108. A nut 112 prevents implement 108 and plate 110 from becoming disengaged from the drive shaft 90. A coil spring 114 is concentrically received on the drive shaft 90 between the dish element 84 and the plate 110. Accordingly, it should be appreciated that the construction illustrated allows for the drive shaft 90 to be lifted vertically relative to the base 12 against the spring pressure of spring 114. Of course, implement 108 is rigidly secured to the drive shaft 90.

Guide arms 120 and 122 are carried on each side of the base 12 and are adapted to be in continual engagement with the ground surface 40. Each of the guide arms 120 and 122 are arcuate as particularly illustrated in FIGURES 1 and 2. Terminal bearings 124 and 126 are provided and transverse arms 128 and 130, formed integral with the arcuate arms 120 and 122 are rotatably received in the terminal bearings 124 and 126. Accordingly, it will be appreciated that as the lawn mower 10 is moved along the ground surface 40, undulations thereof will cause the arms 120 and 122 to pivot about a horizontal axis extending through the bearings 124 and 126. The arcuate arms 120 and 122 are joined by link 132 which has an obliquely extending member 134 formed integral therewith. The member 134 terminates in a forked portion 136 with the bifurcations of the forked portion 136 engaging the shoulder 102 of the collar 100. Accordingly, it will be apparent that as the mower 10 is moved along the ground surface, the arcuate arms 120 and 122 in engagement with the ground surface 40 will be pivoted about the horizontal axis through the bearings 124 and 126 due to undulations in the ground surface. This action will raise and lower rod 132 and the oblique member 134 so that the forked portion 136 will lift the collar 100 against the spring pressure of spring 114. Of course, when the collar 100 is lifted, the ball bearing assembly 98, the pulley 96, and the entire drive shaft 90 including the attached implement 108 are lifted. Therefore, it will be appreciated that the implement 108 is automatically maintained at a desired distance above the ground surface which is being mowed. Therefore, scalping of the lawn will be prevented and a consistent cut throughout will be effected.

Figure 2:
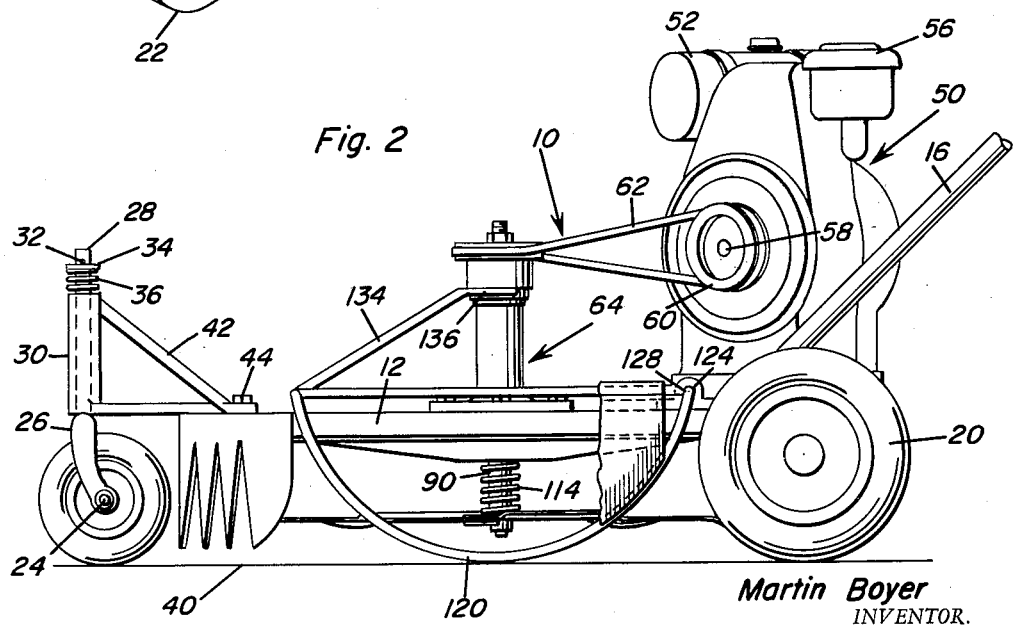
FIGURE 2 is a side elevational view of the lawn mower construction.

Cross members 140 and 142 are provided between the ends of the arcuate arms 120 and 122. Guards 144 and 146 are hinged thereto. In a first pivotal position, as illustrated in FIGURE 1 for guard 146, the guards depend from the cross member 142 so as to substantially project toward the ground surface 40 so as to enclose the implement 108 therein. When this is done, the implement 108, which may be a knife or such, will cut the grass and the force of the grass will tend to slightly pivot the guards outwardly so that windrows of cut grass are formed on either side of the mower path. If the guards 144 are pivoted away from the ground surface 40, as illustrated in FIGURE 1, then the grass will be spread away from the mower path and there will be no evidence of windrow formations.

Although the arcuate arms are illustrated as being connected by rod 132, it is contemplated by the invention that the arcuate arms 120 and 122 be formed separately and each have forked portions associated therewith in engagement with the collar 100. It should also be understood that the arcuate arms do not have to be pivoted to the base 12 at the rear as indicated but may be mounted equally as well for pivotal movement about the other end. Also, although the drawings illustrate the belt 62 driving the shaft 90 through the pulley 96, it is contemplated that direct drive means be utilized between the power source 50 and the mower drive shaft 90.

The base 12 is made substantially circular so as to facilitate the movement of the mower 10 through high grass. It has been found that arcuate arms 120 and 122 which engage the ground surface 40 do not in fact significantly retard the movement of the mower 10. A front guard 146 depends from the base 12 immediately behind the wheel 22. The front guard 146 is provided with tooth projections 148 also facilitating the forward movement of the mower 10 through high grass.

The implement 108 utilized in conjunction with the mower 10 may be either the knife or cutter 150 illustrated in FIGURES 4 and 6 or the mulcher 160 illustrated in FIGURE 5. The knife or cutter 150, of course, defines razor sharp edges 152. Moreover, the knife 150 is struck upwardly as at 154 to provide a grass deflector. By raising the knife construction at 154 as illustrated, the knife 150 acquires characteristics somewhat like a fan and acts to deflect the grass so as to maintain the knife clean. The knife 150 is depressed at 156 as by having an intermediate portion of the knife struck therefrom so as to prevent scalping of the grass by providing a lift effect on the knife.

The mulcher 160 includes a central plate 162 defining end sleeves at 164 and 166 which in fact comprise plate portions folded back upon itself and bolted at 168. Within each of the sleeves are received coil springs 170 and 172 which, in fact, beat grass, trash, and leaves, etc. Of course, to utilize either of the implements with the mower 10, it is merely necessary to remove the nut 112 from the threaded end 94 of the drive shaft and the implement 108 and securing plate 110 may then be manually removed from the shaft 90.

From the foregoing, it will be appreciated that an automatic rotary lawn mower has been described which due to its many automatic features prevents scalping of the lawn and assures proper cutting thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A rotary lawn mower construction comprising a base, ground wheels dependingly supported from said base, a mower drive shaft slidably extending through and rotatably carried by said base, a horizontally extending implement secured to said shaft, guide means mounted on said base in lateral alignment with said drive shaft adapted to continuously engage the ground surface and means connecting said guide means to said drive shaft whereby said implement may be automatically maintained at a constant spacing above said ground surface, said guide means including a pair of arcuate arms, each of said arms pivoted at a first end to said base on opposite sides of said base in proximity thereto so as to straddle said implement, and means operatively connecting each of said arms to said shaft at a second end thereof for sliding said shaft through said base.

2. A rotary lawn mower construction comprising a base, ground wheels dependingly supported from said base, a mower drive shaft slidably extending through and rotatably carried by said base, an implement secured to said shaft, guide means mounted on said base adapted to continuously engage the ground surface and means connecting said guide means to said drive shaft whereby said implement may be automatically maintained at a constant spacing above said ground surface, said guide means including a pair of arcuate arms, each of said arms pivoted at a first end to said base on opposite sides of said base, and means operatively connecting each of said arms to said shaft at a second end thereof for sliding said shaft through said base, and side safety plates hinged on and above each of said arms and pivotable between a first position extending proximate said ground surface and a second position extending remote from said ground surface.

3. A rotary lawn mower construction comprising a base, ground wheels dependingly supported from said base, a mower drive shaft slidably extending through and rotatably carried by said base, a horizontally extending implement secured to said shaft, guide means mounted on said base in lateral alignment with said drive shaft adapted to continuously engage the ground surface and means connecting said guide means to said drive shaft whereby said implement may be automatically maintained at a constant spacing above said ground surface, said guide means including a pair of arcuate arms, each of said arms pivoted at a first end to said base on opposite sides of said base so as to straddle said implement, and means operatively connecting each of said arms to said shaft at a second end thereof for sliding said shaft through said base, and spring means received between said implement and said base for resisting sliding of said shaft in one direction.

4. A rotary lawn mower construction comprising a base, ground wheels dependingly supported from said base, a mower drive shaft slidably extending through and rotatably carried by said base, a horizontally extending implement secured to said shaft, guide means mounted on said base in lateral alignment with said drive shaft adapted to continuously engage the ground surface and means connecting said guide means on said drive shaft whereby said implement may be automatically maintained at a constant spacing above said ground surface, said guide means including a pair of arcuate arms, each of said arms pivoted at a first end to said base on opposite sides of said base in proximity thereto so as to straddle said implement, and means operatively connecting each of said arms to said shaft at a second end thereof for sliding said shaft through said base, a collar carried by said base having a shoulder formed thereon, said shaft rotatably extending through said collar, said means operatively connecting said arms to said shaft including a forked portion, said forked portion engaged with said shoulder, and spring means received between said implement and said base for resisting sliding of said shaft in one direction, and power means carried by said base drivingly associated with said drive shaft, and side safety plates hinged on and above each of said arms and pivotable between a first position extending proximate said ground surface and a second position extending remote from said ground surface.

5. A rotary lawn mower construction comprising a base, ground wheels dependingly supported from said base, a mower drive shaft slidably extending through and rotatably carried by said base, an implement secured to said shaft, guide means mounted on said base adapted to continuously engage the ground surface and means connecting said guide means to said drive shaft whereby said implement may be automatically maintained at a constant spacing above said ground surface, said implement comprising a horizontally extending elongated blade, said blade having sharp edges and portions therein struck downwardly therefrom to prevent the blade from digging into the ground.

6. A rotary lawn mower construction comprising a base, ground wheels dependingly supported from said base, a mower drive shaft slidably extending through and rotatably carried by said base, an implement secured to said shaft, guide means mounted on said base adapted to continuously engage the ground surface and means connecting said guide means to said drive shaft whereby said implement may be automatically maintained at a constant spacing above said ground surface, said implement comprising a plate, and opposed coil springs curved in cross section secured on one end thereof to said plate and extending generally horizontally.

References Cited in the file of this patent

UNITED STATES PATENTS

| | | |
|---|---|---|
| 2,141,806 | Zielesch | Dec. 27, 1938 |
| 2,471,367 | Cavaness | May 24, 1949 |
| 2,514,407 | May | July 11, 1950 |
| 2,551,817 | Taylor | May 8, 1951 |
| 2,710,514 | Broussard | June 14, 1955 |
| 2,775,856 | Hoch | Jan. 1, 1957 |
| 2,810,251 | Shippey | Oct. 22, 1957 |
| 2,902,814 | Lewis et al. | Sept. 8, 1959 |

FOREIGN PATENTS

| | | |
|---|---|---|
| 212,130 | Australia | Nov. 6, 1957 |